US006845375B1

(12) United States Patent
Sinclair

(10) Patent No.: US 6,845,375 B1
(45) Date of Patent: Jan. 18, 2005

(54) MULTI-LEVEL PARTITIONED DATABASE SYSTEM

(75) Inventor: Paul Laurence Sinclair, Manhattan Beach, CA (US)

(73) Assignee: NCR Corporation, Dayton, OH (US)

(*) Notice: Subject to any disclaimer, the term of this patent is extended or adjusted under 35 U.S.C. 154(b) by 350 days.

(21) Appl. No.: 09/986,229

(22) Filed: Oct. 20, 2001

(51) Int. Cl.$^7$ .......................... G06F 17/00; G06F 12/00
(52) U.S. Cl. ...................... 707/100; 707/205; 711/153
(58) Field of Search .................... 707/1–2, 100–101, 707/200, 205; 709/215; 711/153

(56) References Cited

U.S. PATENT DOCUMENTS

| | | | |
|---|---|---|---|
| 5,721,907 A | 2/1998 | Pyne | |
| 5,787,411 A | 7/1998 | Groff et al. | |
| 5,835,755 A | 11/1998 | Stellwagen | |
| 5,860,070 A | 1/1999 | Tow et al. | |
| 6,105,026 A | 8/2000 | Kruglikov et al. | |
| 6,115,705 A | 9/2000 | Larson | |
| 6,263,331 B1 * | 7/2001 | Liu et al. ........................ | 707/4 |
| 6,349,310 B1 | 2/2002 | Klein et al. | |
| 6,370,529 B1 | 4/2002 | Kruglikov et al. | |
| 6,401,098 B1 | 6/2002 | Moulin | |
| 6,421,662 B1 | 7/2002 | Karten | |
| 6,493,699 B2 | 12/2002 | Colby et al. | |
| 2002/0065815 A1 * | 5/2002 | Layden ........................... | 707/3 |
| 2002/0194157 A1 * | 12/2002 | Zait et al. ....................... | 707/2 |

OTHER PUBLICATIONS

U.S. Appl. No. 2002/016572, Greene et al., filed Nov. 2002.

* cited by examiner

Primary Examiner—Alford Kindred
(74) Attorney, Agent, or Firm—Baker Botts

(57) ABSTRACT

A database system with multi-level partitioning is disclosed. The system includes a plurality of storage facilities with each storage facility storing data that represents rows of database tables. In each storage facility table rows corresponding to a specific table are logically ordered according to a row identifier, also called the row ID. The row ID includes a first value that is based on one or more columns of the table. The row ID also includes a second value that is based on one or more columns of the table. The row ID also includes a third value. The first value is calculated based on a single-level function. The single-level function is a combination of a plurality of functions. The single-level function produces different values for two rows when any of the plurality of functions produces different values for the two rows. The first value of the row ID is predominate in determining the order of the rows in the storage facilities. The second value determines the order of those rows with identical first values. If any rows have identical first and second values, the third value determines the order of those rows.

20 Claims, 4 Drawing Sheets

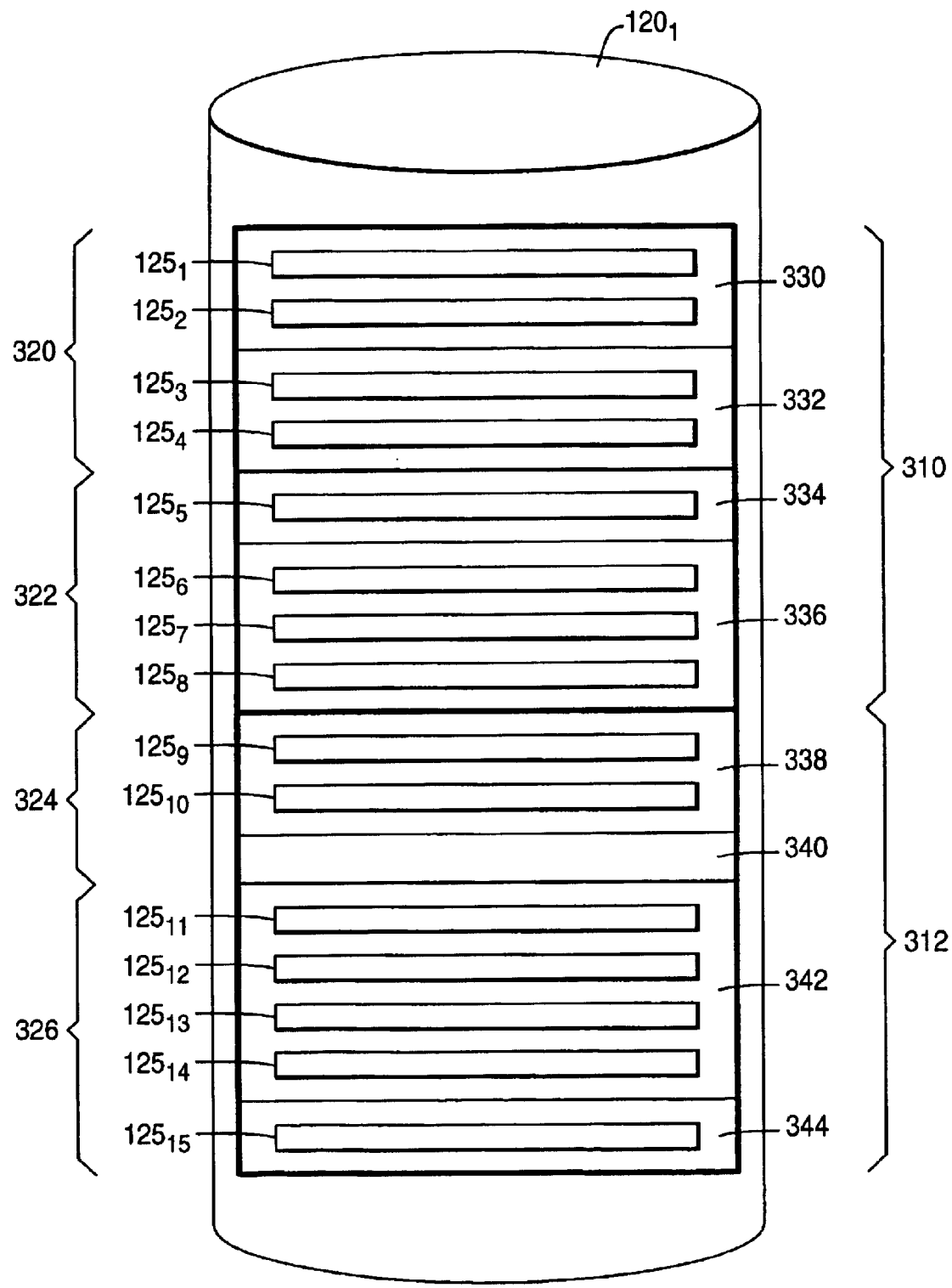

MULTI-LEVEL PARTITIONED DATABASE SYSTEM

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Users of relational database systems require the minimum time possible for execution of complex queries against large amounts of data. Different physical types of storage, for example random access memory and hard drives, incur different length delays. In addition, writing to memory or a hard drive is often slower than reading an equivalent amount of data from memory or a hard drive. The organization of data corresponding to tables defined in a relational database system may determine the number of writes and reads that need to be performed in order to execute a common query. In some situations, particular portions of the data in a table are searched more often than other portions. If the data is properly organized, performance can be improved by searching a part of the data for queries that can take advantage of that organization. If the data is not organized in any way, it will often need to be searched in its entirety to satisfy a query or copied and restructured into a useful organization.

SUMMARY

In general, in one aspect, the invention features a database system with multi-level partitioning. The system includes a plurality of storage facilities with each storage facility storing data that represents rows of database tables. In each storage facility table rows corresponding to a specific table are logically ordered according to a row identifier, also called the row ID. The row ID includes a first value that is based on one or more columns of the table. The row ID also includes a second value that is based on one or more columns of the table. The row ID also includes a third value. The first value is calculated based on a single-level function. The single-level function is a combination of a plurality of functions. The single-level function produces different values for two rows when any of the plurality of functions produces different values for the two rows. The first value of the row ID is predominate in determining the order of the rows in the storage facilities. The second value determines the order of those rows with identical first values. If any rows have identical first and second values, the third value determines the order of those rows.

In a more specific implementation of the invention, the plurality of functions are combined into the single-level function using the following formula: $P=( \ldots ((P_1-mn_1)*(mx_2-mn_2+1)+P_2-mn_2)*(mx_3-mn_3+1)+ \ldots + P_{(n-1)}-mn_{(n-1)})*(mx_n-mn_n+1)+P_n-mn_n)$ where P is the single-level function, $P_i$ is the ith one of the plurality of functions, $mx_i$ and $mn_i$ are the maximum and minimum values of $P_i$, respectively, the initial ellipses represents a number of left parentheses necessary to match each right parenthesis that is included for each of the plurality of functions as shown above, and the second ellipses repeats the pattern to include a term for each combined function.

The multi-level partitioned database system has the advantage of organizing the data stored by the system. For example, this organization allows access in multiple ways via the multiple partitioning expressions. For instance, if a query gives values for columns of the second partitioning function but not the first, a scan of rows is only needed in each of the first level partitions but only for the designated second level partition within each of those first level partitions. Other features and advantages will become apparent from the description and claims that follow.

BRIEF DESCRIPTION OF THE DRAWINGS

FIG. 3B illustrates an example multi-level partitioned database storage facility.

DETAILED DESCRIPTION

Figure 1:
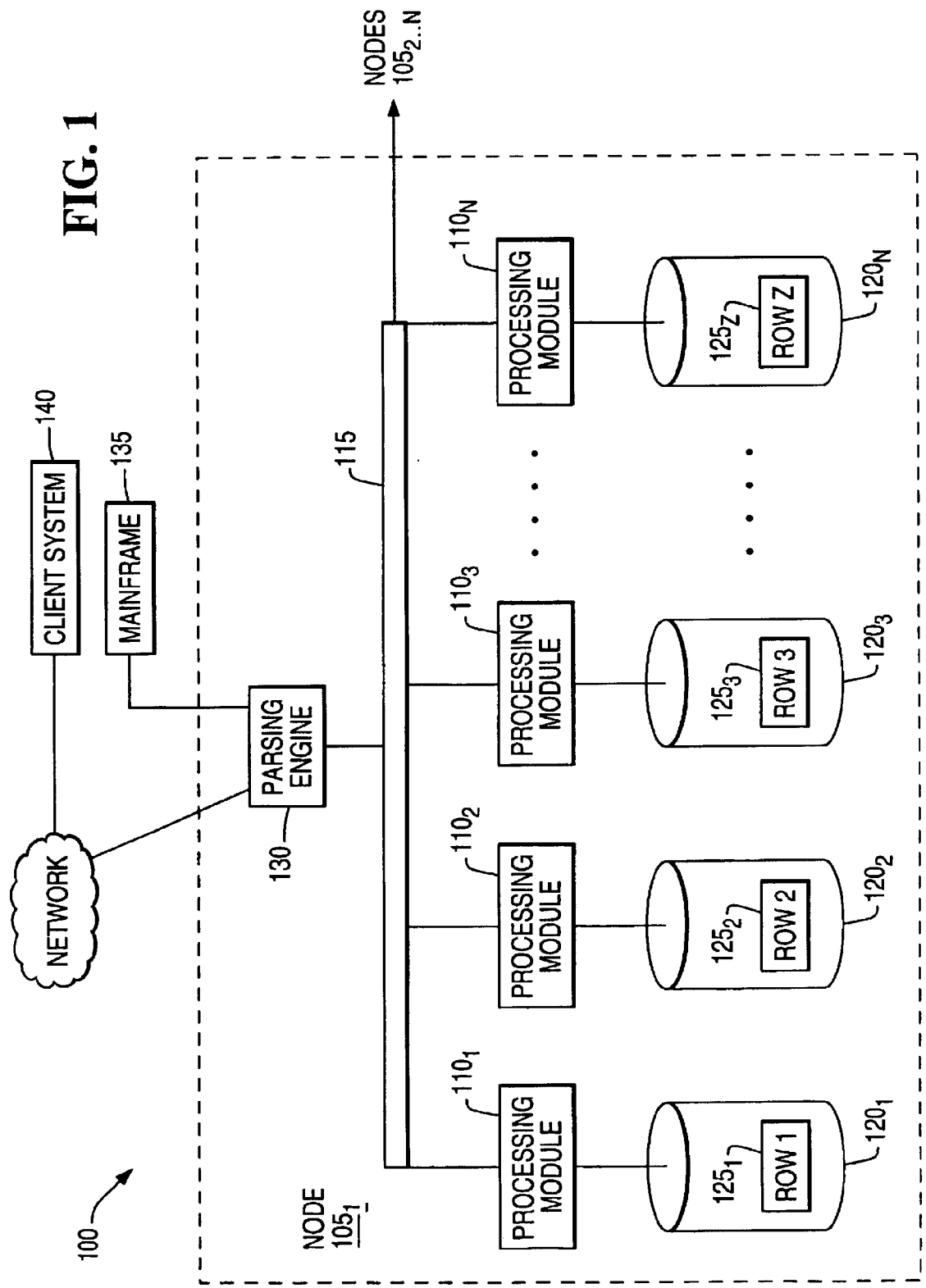
FIG. 1 is a block diagram of a node of a database system.

The partitioned table storage technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

The rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated as a hash bucket. The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
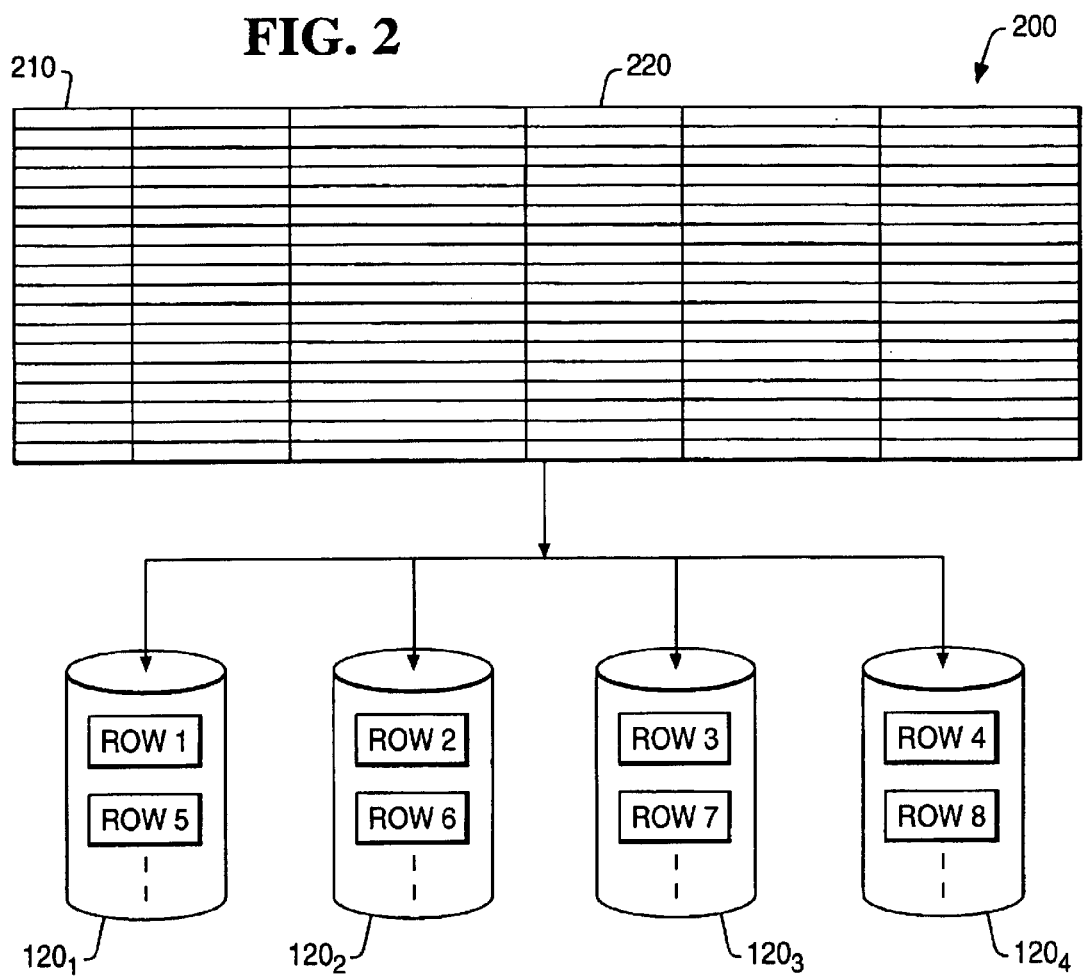
FIG. 2 is a flow diagram of table distribution process.

FIG. 2 shows the rows of a table be distributed. The table 200 contains a plurality of rows and is stored in a plurality of data storage facilities $120_{1-4}$ by the parsing engine 130 (not shown). For example, two columns 210, 220 can be designated as the primary index when the table is created. The hash function is then applied to the contents of columns 210, 220 for each row. The hash bucket portion of the resulting hash value is mapped to one of the data storage facilities $120_{1-4}$ and the row is stored in that facility. For example, if the primary index indicates a column containing a sequential row number and the hash function is the sum of the remainder when the row is divided by four and the value one, the first eight rows will be distributed as shown in FIG. 2.

Queries involving the values of columns in the primary index can be efficiently executed because the processing module $110_n$ having access to the data storage facility $120_n$ that contains the row can be immediately determined. For example, referring to FIGS. 1 and 2, if values from row 2 are desired, the parsing engine 130 can apply the hashing function to determine that only processing module $110_2$ need to be used to access storage facility $120_2$. As another example, an equality join between two tables that have the same primary index columns is very efficient. All of the rows that need to be joined are found in the same data storage facility $120_n$ and no movement of information between the facilities is necessary.

Figure 3A:
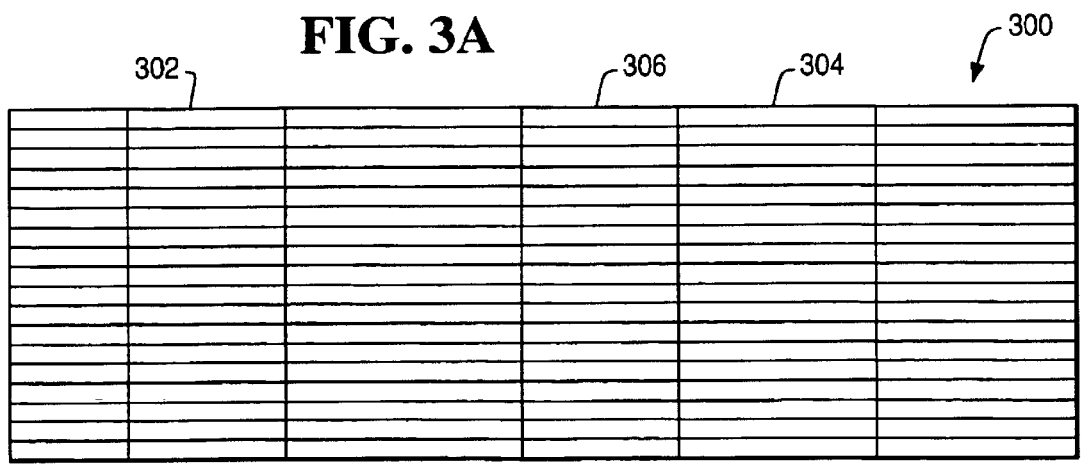
FIG. 3A illustrates an example table to be stored in a database.

While the primary index of a table can be chosen for equality joins, for example the order number column of an order table, additional design features can make searches on other columns, for example the date column of the order table, more efficient. Referring to FIG. 3A, an example table 300 is shown. The table 300 includes six columns. In this example, the user designates a first column 302 as the primary index. The user also expects to perform numerous searches corresponding to a particular function of a second column 306 and another function of a third column 304. The table 300 is created with a command that includes a specification of the primary index, as the first column 302, a first partition function that is evaluated using values from the second column 304, and a second partition function that is evaluated using values from the third column 306. Functions are also referred to as expressions, but will be referred to as functions herein. One possible partition function would be a range function. If the second column 304 contained dates between 1996 and 2001, the partition function could be the difference between the year of the date and 1995, resulting in values of 1 through 6. A single partition function, like a primary index, can include more than one column. For example, a partition function could return the difference between the values in two date columns.

In one implementation, the structure of table 300 has been defined by a command to include a primary index 302 and two different partition functions. The partition functions each including one column, the second column 304 and the third column 306, respectively. The partition functions are combined into a function referred to herein as a single-level partition function such that effectively rows are ordered by the value of first partition function and within such a partition are ordered by the second function. In one implementation, the single-level partition function will produce different values for row data whenever that row data would have produced different values from any of the two or more partition function that were combined to produce the single-level partition function. One formula for generating a single-level partition function, P, from n partition functions is included below wherein $P_i$ represents the $i^{th}$ partition function entered in the table definition that uses values from one or more columns. The variables $mn_i$ and $mx_i$ represent the minimum and maximum resulting values of $P_i$, respectively.

$$P=(\ldots((P_1-mn_1)*(mx_2-mn_2+1)+P_2-mn_2)*(mx_3-mn_3+1)+\ldots +P_{(n-1)})*(mx_n-mn_n+1)+P_n-mn_n) \quad [10]$$

The initial ellipses represents a number of left parentheses necessary to match each right parenthesis that is included for each partition function as shown above. The second ellipses repeats the pattern to include a term for each specified partition function. For example, a table created with three partition functions, $P_1$, $P_2$, and $P_3$, would have the following single-level partition function, P.

$$P=(((P_1-mn_1)*(mx_2-mn_2+1)+P_2-mn_2)*(mx_3-mn_3+1)+P_3-mn_3)$$

As a further example, the three partition functions are: $P_1$(date)=month(date); $P_2$ (date)=year(date); and $P_3$ (product number)=category(product #). The dates range from 1995 to 2001 and there are 8 categories of product numbers, 1 through 8. A single-level partition function, P, is then calculated.

$$P(\text{date, product \#})=(((\text{month(date)}-1)*(2001-1995+1)+\text{year(date)}-1995)*(8-1+1)+\text{category(product \#)}-1)$$

$$P(\text{date, product \#})=(((\text{month(date)}-1)*7+\text{year(date)}-1995)*8+\text{category(product \#)}-1)$$

Other formulas can also be used to generate a single-level partition function from the initial partition functions. For example, if partition number zero is reserved, the value one can be added to the above formula to shift the results up by one. In some implementations, partition number zero is reserved for use by the system.

In FIG. 3B, a multi-level partitioned database storage facility $120_1$ is shown. Rows $125_{1-15}$ are allocated to the storage facility $120_1$ as discussed above with respect to FIG. 2. The rows $125_{1-15}$ are organized within the storage facility $120_1$ in accordance with partitions and the hash value of the primary index. In one implementation, a uniqueness value is assigned to rows to order rows that have identical partition values and hash values. The rows $125_{1-15}$ stored in the storage facility $120_1$ are ordered at a top level by the results of the defined partition functions. Two first level partitions are shown 310, 312. For each first level partition 310, 312, two second level partitions are shown 320, 322, 324, 326. For each first level partition, for example first level partition 310, and each second level partition, for example second level partition 322, two third level partitions are shown, for example third level partitions 334, 336. In other words, rows $125_{6-8}$ have identical results for all three partitions functions when they are applied to the values in those rows. On the other hand, row $125_5$ has the same result for the first two partition functions as rows $125_{6-8}$, but a different result for the third partition function.

While the table is created with separate partition functions resulting in a multi-level partition, the partitions can be implemented using a partition function calculated from the separate partition functions as described in the above-disclosed formula or other similar formulas. In one implementation, that change from multi-level to single level partitioning is not revealed to the user. The table definition, when viewed by the user retains the separate functions for each partition level, but the formula is used to convert queries addressing particular partitions of one of the multiple levels to partitions of the single level.

In one implementation, a row identification (row ID) is stored for each of the rows $125_{1-15}$. The row ID includes a portion that identifies the partition in which that row is located. That partition is determined using the combined partition function, P, calculated from the partition functions specified in the table definition. The length of the partition portion of the row ID determines the number of partitions that can be specified. The total number of partitions for a multi-level partitioning definition is the product of the number of partitions at each level added to the number of reserved partitions. For example, the three partition functions used to illustrate the combination formula above have 12 (the number of months), 7 (the number of possible years), and 8 (the number of product categories) partitions each. If partition zero is reserved, the resulting single-level partition function would require (12*7*8)+1 or 673 partitions. A one-byte partition portion of the row ID would only allow 256 unique partitions and would be inadequate. If the row ID includes two bytes to identify the row ID, the 673 required partitions are easily covered by the 65536 possible values. Some implementations of the invention do not include use of a row ID.

The rows are also ordered within each partition. For example, the partition 342 contains four rows $125_{11-14}$. Those rows $125_{11-14}$ are stored within that partition 342 in the order of the hash result for each row. In one implementation, the hash result is included in a row ID with the partition in which the row is located. A uniqueness value is also maintained for each row. No two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. In one implementation, a uniqueness value is included in a row ID with a hash value and a partition number. For example, a ten-byte row ID can include two bytes for the partition value, four bytes for the hash value, and four bytes for the uniqueness value. If two rows are in the same partition and have the same hash value, their order is determined by their uniqueness values, which by definition cannot be identical. The uniqueness value does not play a role in ordering rows that have different partition or hash values. A larger number of possible hash values increases the number of data storage facilities that can be used to store rows of the database and reduces the chance that multiple rows will have the same hash value. A larger number of possible uniqueness values allow tables with larger numbers of rows with the same hash value to be stored. In an alternate implementation, uniqueness values are not assigned to the rows and the order of rows with identical hash values is not determined.

Figure 4:
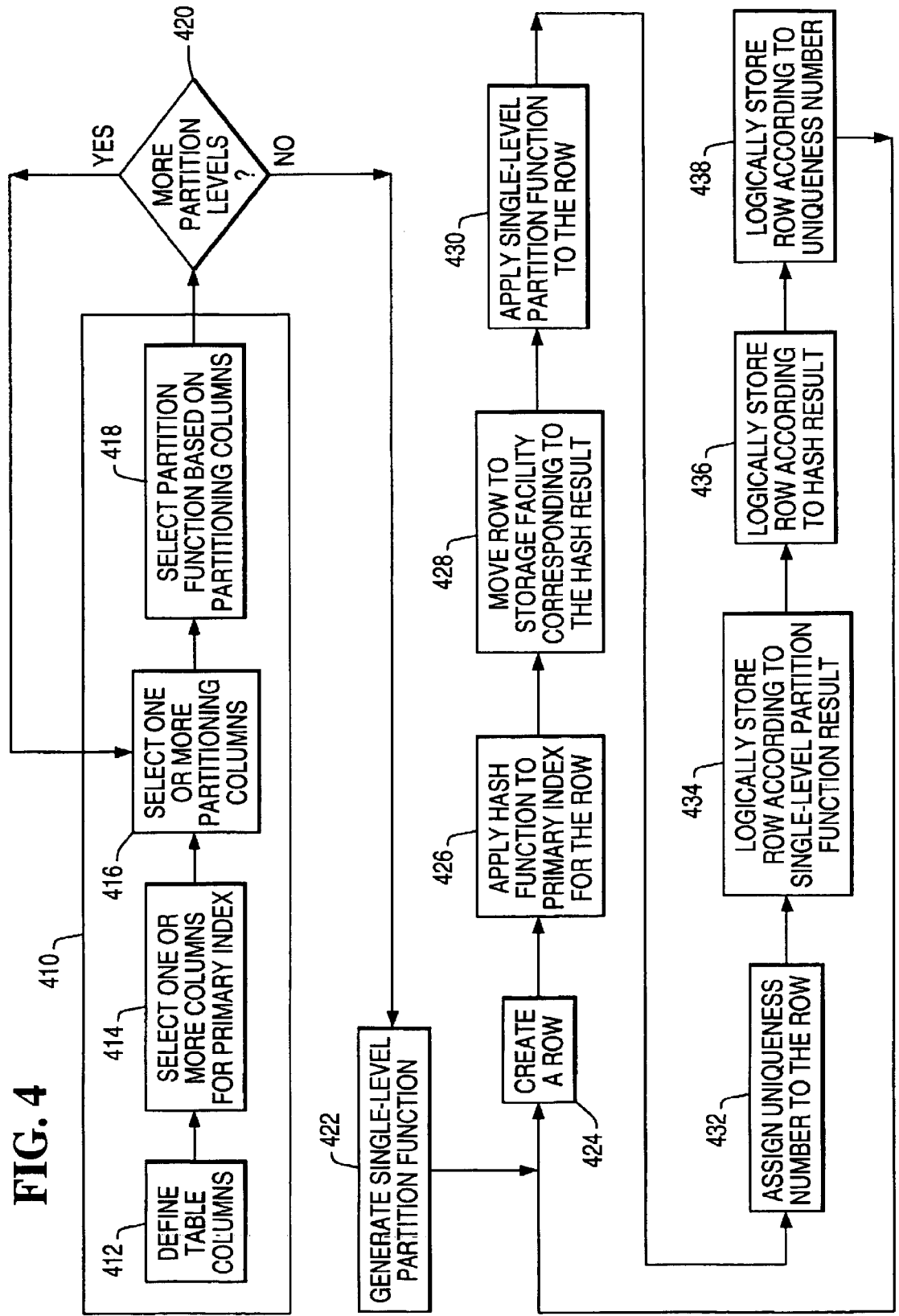
FIG. 4 is a flow chart of an algorithm for creating and storing a multi-level partitioned table in a database system.

FIG. 4 shows a flow chart of an algorithm for creating and storing row data in a multi-level partitioned table in a database system. Initially, a table is created 410. One of the steps in creating a database table is defining the columns that will contain row data for the table 412. The database system can add columns such as a row ID to those specified. One or more columns are chosen as the primary index for the table 414. The primary index is used as the input to the hash function. One or more columns are also chosen as partitioning columns 416 for a partition level. A function is specified that uses the values of the partitioning columns for each row to calculate the partition in that level for that row 418. The selection of a partition function 418 can include specifying minimum and maximum resulting values for that function in some implementations. In an alternate implementation, the minimum and maximum resulting values are determined by applying the selected functions to the data type of the selected columns. The partition function itself may define the partition columns combining steps 416 and 418. More partition columns and functions are selected for each additional partition level 420. Once the partition functions for the multi-level partitioning are selected, a single-level partition function is generated 422. In one implementation the single-level partition function is generated in accordance with formula 10.

Once a table has been defined, users are allowed to fill the table by creating rows 424. The data in the new row is used to determine the hash value and hash bucket by applying the hash function to the columns of the primary index 426. The data storage facility in which the row is stored is determined by the hash bucket in combination with the hash bucket map 428. The single-level partition function is applied to the values in any columns selected for any of the initial partition functions 430. In one implementation a uniqueness number is also assigned to the row 432. The rows for that table in a particular data storage facility are then located in order of the single-level partitions 434. Within the single-level partitions, the rows are located in order of the result of the hash function, the hash value 436. Any rows in a partition that share that hash value are then ordered by the uniqueness value 438, if there is one.

In one implementation, the new row is placed in the proper position relative to the already ordered previously-input rows. In another implementation, several rows are input in a session before reordering according to partition, hash, and uniqueness occurs.

The text above described one or more specific implementations of a broader invention. The invention also is carried out in a variety of alternative implementations and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other implementations are also within the scope of the following claims.

I claim:

1. A multi-level partitioned database system, comprising:
   a plurality of storage facilities, each storage facility including data representing a plurality of table rows;
   wherein table rows in each storage facility that correspond to a specific table are logically ordered according to a row identifier (row ID);
   the row ID comprises a first value based on one or more columns of the table, a second value based on one or more columns of the table, and a third value;
   the first value is calculated based on a single-level function that results from the combination of a plurality of functions, each function of the plurality of functions based one or more columns of the table, the single-level function producing different values for two rows when any of the plurality of functions produces different values for the two rows; and the first value of the row ID is predominate in determining the order of the rows in the storage facilities, the second value determines the order of those rows with identical first values, and the third value determines the order of rows with identical first and second values.

2. The partitioned database system of claim 1, wherein:
the plurality of functions includes at least one function based on ranges of values in a column.

3. The partitioned database system of claim 2, wherein the ranges of values in a column are ranges of dates.

4. The partitioned database system of claim 1, wherein the second value is a value in a specified column.

5. The partitioned database system of claim 1, wherein the second value is the result of applying a hash function to a value in a specified column.

6. The partitioned database system of claim 1, wherein the row ID is 80 bits.

7. The partitioned database system of claim 1, wherein the first value is specified by 16 bits.

8. The partitioned database system of claim 1, wherein table rows are distributed among the plurality of storage facilities based on the second value.

9. The partitioned database system of claim 1, wherein the third value is a uniqueness value that differentiates rows having equal first and second values.

10. The partitioned database system of claim 1, wherein the single-level function is calculated in accordance with the formula:

$$P=(\ldots((P_1-mn_1)*(mx_2-mn_2+1)+P_2-mn_2)*(mx_3-mn_3+1)+\ldots +P_{(n-1)}-mn_{(n-1)})*(mx_n-mn_n+1)+P_n-mn_n)$$

where P is the single-level function, $P_i$ is an $i^{th}$ function of the plurality of functions, and $mn_i$ and $mx_i$ are a minimum and a maximum resulting values of $P_i$.

11. A method for building a table in a multi-level partitioned database system, comprising the steps of:
defining columns in the table;
selecting a plurality of functions, each function of the plurality of functions based on one or more columns of the table;
selecting a second group of one or more columns;
selecting a second function based on the third group of columns;
creating rows of the table;
generating a single-level function that results from the combination of the plurality of functions;
storing rows of the table in a logical order corresponding to the result of the single-level function for each row; and
if more than one row of the table has an identical result of the single-level function, storing those rows in a logical order corresponding to the result of the second function; and
if more than one row of the table has identical results of the single-level and second functions, storing those rows in a logical order corresponding to a third value.

12. The method of claim 11, wherein the third value is an assigned uniqueness number for each row.

13. A method for building a table in a multi-level partitioned database system, comprising the steps of:

defining columns in the table;
selecting a plurality of functions, each function of the plurality of functions based on one or more columns of the table;
selecting a second group of one or more columns;
selecting a second function based on the third group of columns;
creating rows of the table;
generating a single-level function that results from the combination of the plurality of functions;
storing rows of the table in a logical order corresponding to the result of the single-level function for each row; and
if more than one row of the table has an identical result of the single-level function, storing those rows in a logical order corresponding to the result of the second function, wherein the step of storing rows comprises:
distributing rows of the table to a plurality of storage facilities based on the result of the second function; and
in each storage facility, storing rows of the table in a logical order corresponding to the result of the single-level function for each row and, if more than one row of the table has an identical result of the single-level function, storing those rows in a logical order corresponding to the result of the second function.

14. A method for building a table in a multi-level partitioned database system, comprising the steps of:
defining columns in the table;
selecting a plurality of functions, each function of the plurality of functions based on one or more columns of the table;
selecting a second group of one or more columns;
selecting a second function based on the third group of columns;
creating rows of the table;
generating a single-level function that results from the combination of the plurality of functions;
storing rows of the table in a logical order corresponding to the result of the single-level function for each row; and
if more than one row of the table has an identical result of the single-level function, storing those rows in a logical order corresponding to the result of the second function, wherein the first function of the plurality of functions assigns a value to each of several ranges of values in a date column.

15. A method for building a table in a multi-level partitioned database system comprising the steps of:
defining columns in the table;
selecting a plurality of functions, each function of the plurality of functions based on one or more columns of the table;
selecting a second group of one or more columns;
selecting a second function based on the third group of columns;
creating rows of the table;
generating a single-level function that results from the combination of the plurality of functions;
storing rows of the table in a logical order corresponding to the result of the single-level function for each row; and
if more than one row of the table has an identical result of the single-level function, storing those rows in a logical order corresponding to the result of the second function, wherein the second function is a hash function.

16. A method for building a table in a multi-level partitioned database system, comprising the steps of:

defining columns in the table;

selecting a plurality of functions, each function of the plurality of functions based on one or more columns of the table;

selecting a second group of one or more columns;

selecting a second function based on the third group of columns;

creating rows of the table;

generating a single-level function that results from the combination of the plurality of functions;

storing rows of the table in a logical order corresponding to the result of the single-level function for each row; and if more than one row of the table has an identical result of the single-level function, storing those rows in a logical order corresponding to the result of the second function, wherein the results of the single-level and second functions for each row are included in a row ID.

17. A method for building a table in a multi-level partitioned database system, comprising the steps of:

defining columns in the table;

selecting a plurality of functions, each function of the plurality of functions based on one or more columns of the table;

selecting a second group of one or more columns;

selecting a second function based on the third group of columns;

creating rows of the table;

generating a single-level function that results from the combination of the plurality of functions;

storing rows of the table in a logical order corresponding to the result of the single-level function for each row; and if more than one row of the table has an identical result of the single-level function, storing those rows in a logical order corresponding to the result of the second function, wherein the plurality of functions are two functions and the single-level function is generated in accordance with the formula:

$$P=((P_1-mn_1)*(mx_2-mn_2+1)+P_2-mn_2)$$

where P is the single-level function, $P_1$ is the first function of the plurality of functions, $P_2$ is the second function of the plurality of functions, and $mn_i$ and $mx_i$ are a minimum and a maximum resulting values of $P_i$.

18. A method for building a table in a multi-level partitioned database system comprising the steps of:

defining columns in the table;

selecting a plurality of functions, each function of the plurality of functions based on one or more columns of the table;

selecting a second group of one or more columns;

selecting a second function based on the third group of columns;

creating rows of the table;

generating a single-level function that results from the combination of the plurality of functions;

storing rows of the table in a logical order corresponding to the result of the single-level function for each row; and if more than one row of the table has an identical result of the single-level function, storing those rows in a logical order corresponding to the result of the second function, wherein the single-level function is generated in accordance with the formula:

$$P=(\ldots ((P_1-mn_1)*(mx_2-mn_2+1)+P_2-mn_2)*(mx_3-mn_3+1) + \ldots + P_{(n-1)}-mn_{(n-1)})*(mx_n-mn_n+1)+P_n-mn_n)$$

where P is the single-level function, $P_i$ is an $i^{th}$ function of the plurality of functions, and $mn_i$ and $mx_i$ are a minimum and a maximum resulting values of $P_i$.

19. A computer program, stored in a tangible medium, for building a table in a multi-level partitioned database system, the program comprising executable instructions that cause a computer to:

store column definitions of the table;

store a plurality of functions, each based on values in one or more columns;

store a second group of one or more columns;

store a second function based on values in each column of the second group of columns;

receive data for rows of the table;

generate a single-level function that results from the combination of the plurality of functions;

store rows of the table in a logical order corresponding to the single-level function for each row; and if more than one row of the table has an identical result of the single-level function, store those rows in a logical order corresponding to the result of the second function, where the computer stores rows by;

distributing rows of the table to a plurality of storage facilities based on the result of the second function; and in each storage facility, storing rows of the table in a logical order corresponding to the result of the single-level function for each row and, if more than one row of the table has an identical result of the single-level function, storing those rows in a logical order corresponding to the result of the second function.

20. A computer program, stored in a tangible medium, for building a table in a multi-level partitioned database system, the program comprising executable instructions that cause a computer to:

store column definitions of the table;

store a plurality of functions, each based on values in one or more columns;

store a second group of one or more columns;

store a second function based on values in each column of the second group of columns;

receive data for rows of the table;

generate a single-level function that results from the combination of the plurality of functions;

store rows of the table in a logical order corresponding to the single-level function for each row; and if more than one row of the table has an identical result of the single-level function, store those rows in a logical order corresponding to the result of the second function, where the single-level function is generated in accordance with the formula:

$$P=\ldots ((P_1-mn_1)*(mx_2-mn_2+1)+P_2-mn_2)*(mx_3-mn_3+1)+(\ldots +P_{(n-1)}-mn_{(n-1)}))*(mx_n-mn_n+1)+P_n-mn_n)$$

where P is the single-level function, $P_i$ is an $i^{th}$ function of the plurality of functions, and $mn_i$ and $mx_i$ are a minimum and a maximum resulting values of $P_i$.

* * * * *